Oct. 18, 1955   C. A. STOKES   2,720,939
PROCESS FOR RECOVERING AEROSOL SOLIDS
Filed April 14, 1951
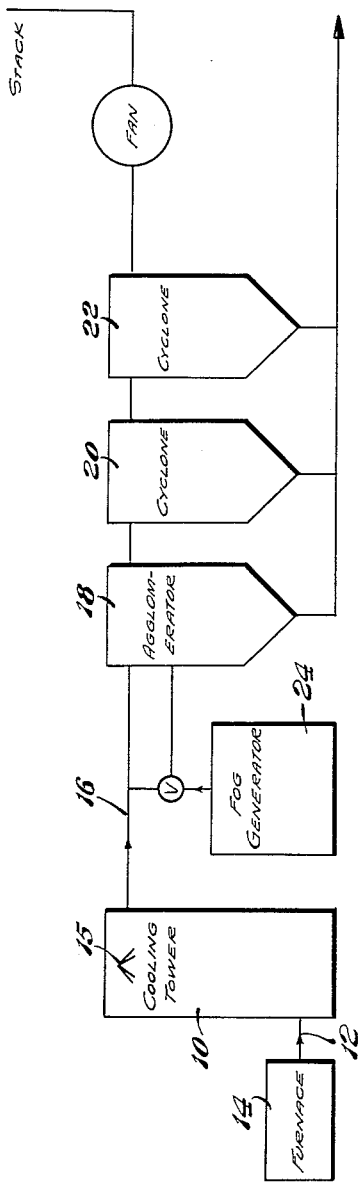
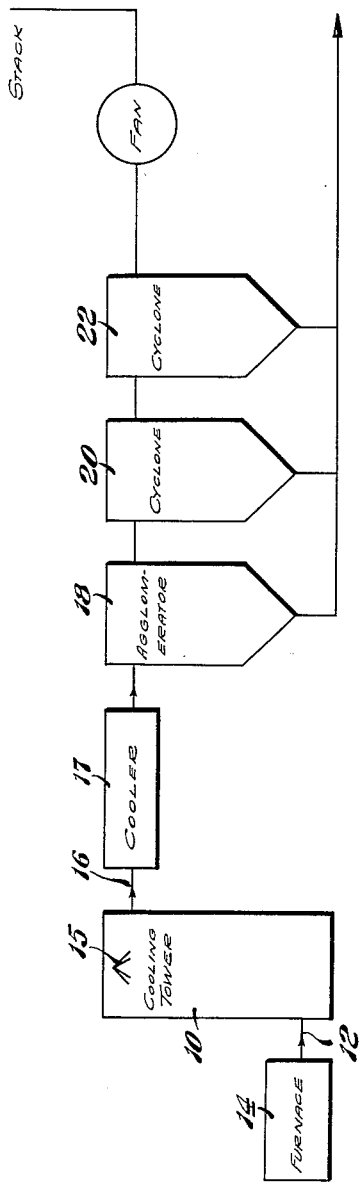
INVENTOR.
Charles A. Stokes
BY

United States Patent Office

2,720,939
Patented Oct. 18, 1955

2,720,939

PROCESS FOR RECOVERING AEROSOL SOLIDS

Charles A. Stokes, Wellesley Hills, Mass., assignor to Godfrey L. Cabot, Inc., Boston, Mass., a corporation of Massachusetts Application April 14, 1951, Serial No. 221,020

1 Claim. (Cl. 183—121)

This invention relates to the recovery of solid particles from gaseous suspensions and comprises a new and improved process for agglomerating such particles into aggregates of recoverable size.

In many industrial processes off gases contain varying amounts of very fine particles of solid materials requiring collection, either because they constitute the product of the process or because they are contaminants when released into the atmosphere. When the particles are of colloidal size, i. e., less than about 0.5 micron in diameter, as is the case with carbon black, fly ash and the like, collection presents a serious problem. Bag filters are effective but are not entirely satisfactory due to the relatively large pressure drop across the bags, to condensation of moisture around the bags, to frequent bag failure and to the necessity of shaking out the bags periodically. An alternative method of collection, electric or sonic agglomeration and cyclone separation, is more commonly employed but does not achieve complete collection. In fact, when the particles in the gas average less than 0.5 micron in diameter and are present at dilutions of 5 grains per cubic foot or less, a large fraction will pass on through the agglomerator and cyclone separators and out the stack. And when the particles are of material that will not agglomerate at all in an electric or sonic agglomerator, the percentage of loss will be even higher.

The magnitude of the product loss is proportional to the fineness and inversely proportional to the grain loading of the particles which are being produced, and in the case of fine furnace (FF) carbon blacks, for example, the loss may amount to as much as 35%. Financially, this waste of product is serious. Moreover, escaping product may create an annoying smoke nuisance to the surrounding countryside.

It is a difficult problem to recover fine smoke particles because the settling rate of such particles diminishes rapidly as the particle size decreases. For example, a spherical particle having a diameter of 10 microns and a density equal to two grams per cubic centimeter will settle in still air at a rate of about 0.5 centimeter per second while a particle of the same density having a diameter of 1 micron will settle at a rate of only .006 centimeter per second.

It is the principal object of this invention to provide a novel and improved process whereby substantially complete collection of the smallest size gas-borne solid particles may be effected.

It is also an object of this invention to provide a process for effecting satisfactory agglomeration in a precipitator of substantially all of the solid particles suspended in gas streams passing therethrough.

It is a further object of this invention to provide a process for effecting agglomeration in an agglomerator of gas-borne solid particles of materials which cannot otherwise be made to agglomerate by electrostatic or sonic forces.

In conventional practice gases containing fine solid particles are conducted through an agglomerator, which may be of the well known electrical type, such as the Cottrell, or of the newer sonic type, such as the ultrasonic, in which the particles are caused to agglomerate into larger aggregates. As the orientation of the particles in the carrier gases is far from uniform, aggregates of many sizes will be formed and some of the particles will fail altogether to agglomerate. The largest aggregates will be sufficiently heavy to fall out in the agglomerator but by far the largest proportion will pass on through. The gases, now with most of the particles therein at least somewhat agglomerated, are then conducted through conventional cyclone separators in which most of the agglomerates will be caused to settle out. The remainder of the particles are exhausted with the gases to the atmosphere.

In accordance with this invention the efficiency of agglomeration is vastly increased over that achieved by these procedures heretofore known. In fact, by the practice of this invention, all, or substantially all, of the gas-borne particles are caused to agglomerate into aggregates so large that the major proportion of the particles will be collected in the agglomerator and any remaining proportion will be collected in the cyclones.

This invention is based upon the principle that when a liquid which will wet the surface of the particles, such as water, is introduced into the gas-solid aerosol stream in the form of a stable fog or mist, a tremendous increase in agglomeration of the solid particles in the aerosol occurs. Whereas without the introduction of the mist large numbers, and in the case of certain materials, all of the solid particles escape agglomeration entirely, with the addition of the mist very few particles escape collision with one another and consequent agglomeration.

It is, of course, old to separate solids from gases by means of liquid sprays or curtains which scrub the solids out of the gases. The disadvantage of such method is that large quantities of liquid are required from which the solids must be separated as a separate process step. Additionally, extensive wetting of the solids may be harmful to them. The process of this invention makes unnecessary the use of large quantities of liquid and does not cause wetting of the product sufficient to form a liquid slurry.

While best results are achieved when the liquid fog particles are in the aerosol range, a fine spray in which the droplets may be as large as about 80 microns in diameter will serve to improve agglomeration efficiency. It is merely necessary that the liquid droplets be sufficiently small and sufficiently disperse to remain gas borne, or to constitute a stable fog, under the conditions of flow encountered in the system and not to knock out the solid particles in the manner of a scrubbing spray or curtain. In practice the fog will consist of particles non-uniform in size. The presence of a small number of oversize droplets will not make the process of my invention inoperable.

The fog contemplated by this invention may be generated in any convenient manner. For example, where the gases carrying the solid particles to be collected also contain substantial quantities of liquid vapors at elevated temperatures, the vapors may be reduced in temperature to their dew points and thereafter be uniformly cooled to condense the moisture in accordance with well known principles. Or the fog can be separately generated and introduced into the gas stream. Or very finely atomized liquid sprays in which the droplets are within the size range discussed above can be introduced directly into the gas stream. However or wherever generated and introduced into the aerosol stream, the fog in substantial volume must be mingled with the gas-borne particles in the agglomerator to accomplish the purposes of this invention.

In the agglomeration chamber the intermingled constituents of the gas stream, namely, the carrier gases, solid particles and mist particles, are subjected to electrostatic, sonic or other forces. These forces cause the particles to collide with one another and agglomerate.

It is not fully understood just why the addition of a fog or mist increases the agglomerative effect. One reasonable explanation is that the incidence of collision is greatly increased, particularly in a superimposed force field, by reason of the presence of an increased number of particles. Apparently the striking of a solid particle by a liquid particle tends to prevent the escape of the solid and to increase the chance of its making contact with other solid particles. Additionally, the liquid probably serves as an adhesive so that when two solid particles with wet surfaces come into contact with one another they adhere together. Yet a third phenomenon may be present. It is quite possible that the distribution of electrical charges of opposite polarities in a system in which solid and liquid particles are contained favors the agglomeration of the solid particles.

The novel process of this invention will better be understood and appreciated from the following description of illustrative examples thereof in connection with the accompanying diagramatic drawings of apparatus which may advantageously be employed in carrying it out although the process is not restricted to this or to any specific type of apparatus.

In the drawings, Figs. 1 and 2 are diagrammatic flow sheets.

While this description is presented with reference to the recovery of carbon black it will be understood that the process of this invention is not limited to the carbon black art.

In the drawings, combustion gases with entrained carbon black are represented as being conducted into a cooling tower 10 through a flue 12 leading from the carbon black producing furnace 14. The tower 10 is provided with a water spray 15 for cooling the black and gas to about 450° Fahrenheit. The cooled gases with their burden of carbon black pass from the tower 10 through a flue 16 into an electrical or sonic agglomerator 18 and a pair of cyclone separators 20 and 22. A mist or fog is introduced into agglomerator 18 from a fog generator 24 or the fog may be introduced at an intermediate point as into flue 16.

The fog generator may be of any conventional design which provides a majority of liquid particles having a particle size below about 80 microns in diameter. Depending upon the volume of combustion products contained in flue 16, the volume of mist introduced will vary so that at all times the grain loading of the fog will be at least equivalent to the grain loading of the carbon black contained in flue 16. Sonic or electrostatic force is induced in the agglomerator causing the majority of the black particles to agglomerate and fall out of suspension. The gases then pass into the cyclone where additional collection is accomplished.

Alternative apparatus for carrying out the process of this invention and illustrated in Fig. 2 contemplates the substitution of a cooling device for the mist generator 24 of the system shown in Fig. 1, whereby the fog is obtained from the moisture content of the gases passing through flue pipe 16. In this embodiment the fluid pipe 16 is connected to a cooler 17 which may contain brine-filled coils or carbon dioxide in solid or liquid state. Such a cooling arrangement will uniformly depress the temperature of the moisture-containing product gases. By uniform cooling, the moisture constituent of these gases is condensed into a fog or mist making possible the elimination of the fog generator referred to above.

Further variations from the process above described are contemplated as being within the scope of this invention. Additional cyclones may be interposed between cooling tower and agglomerator wherein the black particles having sufficient density to be precipitated are removed before being affected by the mist particles. Or a second agglomerator can be tacked onto the end of the conventional dry collection system and the fog can be introduced thereinto in a manner described above.

While, as has been said, the process of this invention is suitable for the collection of any finely divided solid particles carried in any type of gas it is particularly applicable to the collection of carbon black which is one of the most difficult of solid substances to collect. Owing to the extreme subdivision of carbon black particles and the highly dilute system in which they are contained, agglomeration is very difficult to achieve. For instance, about the maximum grain loading of off-gases found when producing the coarsest (80–100 millimicrons average particle diameter) of the carbon blacks is 5 grains per cubic foot. This represents a yield of about 12 pounds of carbon black per 1000 cubic feet of natural gas introduced into the producing furnace. As the particle size decreases so does the grain loading. For the smallest of the furnace black particles, below 40 millimicrons in diameter, the yield of black per 1000 cubic feet of natural gas is only about 2 pounds and the grain loading is below 1 grain per cu. ft. Thus efficient agglomeration is inhibited by the twin factors of small particle size and extreme dilution. It is thus obvious that the process of this invention becomes increasingly important as the particle size of the carbon black produced becomes smaller.

The following example is illustrative of the practice of the process of this invention in the collection of 90–92 scale (nigrometer) carbon black having an average particle diameter in the 80 millimicron range.

| Run No. | Gas Rate, Cu. ft. per min. | Type of Agglomeration | Time of Exposure to Sonic or Electrostatic force, Secs. | Percent Total Collection |
|---|---|---|---|---|
| 10 | 3 | Blank | | 2 |
| 11 | 3 | Fog only | | 7 |
| 12 | 3 | Sonic only | .72 | 14 |
| 13 | 3 | Sonic and fog | .72 | 70 |
| 17 | 3 | Electrostatic only | .44 | 70 |
| 21 | 4 | Electrostatic and fog | .50 | 93 |

Having thus disclosed my invention and described in detail illustrative examples thereof, I claim as new and desire to secure by Letters Patent:

A process for recovering finely-divided solid products from gaseous furnace effluents which comprises intermingling with said effluents a liquid mist of a grain loading of liquid droplets at least equal to that of the solids therein but less than that sufficient to form a liquid slurry with the solid particles, flowing said effluents and mist through an agglomerative force field and then through a cyclonic separation zone and recovering the solid products in substantially dry condition from said separation zone by settling in an essentially gaseous phase.

References Cited in the file of this patent

UNITED STATES PATENTS

| 1,329,737 | Wolcott | Feb. 3, 1920 |
| 2,368,828 | Hanson et al. | Feb. 6, 1945 |
| 2,609,063 | Francis | Sept. 2, 1952 |
| 2,646,133 | Schutt | July 21, 1953 |
| 2,663,382 | Dautrebande | Dec. 22, 1953 |

FOREIGN PATENTS

| 19,032 | Great Britain | Sept. 21, 1899 |
| 102,460 | Australia | Nov. 8, 1937 |
| 329,962 | Great Britain | May 27, 1930 |
| 336,201 | Great Britain | Oct. 6, 1930 |
| 445,775 | Great Britain | Apr. 15, 1936 |
| 460,795 | Great Britain | Feb. 4, 1937 |